United States Patent [19]

Wallace

[11] 4,227,290

[45] Oct. 14, 1980

[54] DRIVE MANDREL FOR HELICAL THREAD INSERTS

[76] Inventor: Robert P. Wallace, Dean's Corner, Rt. 22, Brewster, N.Y. 10509

[21] Appl. No.: 36,829

[22] Filed: May 7, 1979

[51] Int. Cl.3 .............................................. B23P 19/04

[52] U.S. Cl. ...................................... 29/240.5; 29/456

[58] Field of Search ................................ 29/240.5, 456

[56] References Cited

U.S. PATENT DOCUMENTS

| | | | |
|---|---|---|---|
| 3,093,895 | 6/1963 | Eddy | 29/240.5 |
| 3,348,293 | 10/1967 | Newton et al. | 29/240.5 |
| 4,077,101 | 3/1978 | Wallace | 29/240.5 |

*Primary Examiner*—James L. Jones, Jr.

*Attorney, Agent, or Firm*—Mark T. Basseches; Paula T. Basseches

[57] ABSTRACT

The present invention is directed to an improved polymeric drive mandrel for the insertion of helical thread inserts into complementally tapped bores. The mandrel comprises a generally cylindrical body formed of polymeric material externally threaded for the reception of an insert, known per se, the device being characterized by the provision of a metallic drive blade extending generally axially of the polymeric portion, the drive blade including side edges juxtaposed at or intimately adjacent the roots of the threads at at least the drive end of the mandrel, whereby radial compression of the insert, experienced in the course of the driving thereof, is prevented from damaging the lead thread portions of the mandrel and driving torque is distributed over an extended length of the mandrel.

6 Claims, 9 Drawing Figures

DRIVE MANDREL FOR HELICAL THREAD INSERTS

BACKGROUND OF THE INVENTION

1. Field of the Invention

The present invention is in the field of driving tools for application of helical thread inserts into tapped apertures adapted to receive the same.

2. The Prior Art

Helical thread inserts are becoming increasingly used as a means for repairing stripped, worn or damaged threads formed in castings or bores, as well as in original equipment applications wherein it is desired to provide a threaded bore which is particularly resistant to damage as a result of frequent insertion and removal of threaded studs or the like. Often the tapped threads of a bore in a casting or like fixture which may be fabricated of relatively soft metal will disintegrate in use, whereby the threads will no longer afford secure mounting for a bolt or stud.

It is conventional practice to repair such castings by drilling out the bore to remove remnants of the damaged threads, thereafter retapping the bore and inserting into the tapped bore a helical insert, which may be of hardened stainless steel or the like. The outer diameter of the insert intimately engages the newly formed threads in the bore, the inner diameter of the insert corresponding to the diameter and thread pitch presented by the original tapped aperture in the bore.

In order to assure that the helical insert is fixedly positioned within the retapped bore, the helix is formed of a larger diameter than the bore and is driven into position, utilizing substantial torque. The diameter of the insert after driving is less than the diameter of the insert in its unstressed condition, the radial outward forces exerted by the applied insert assuring the frictional retention of the same in the bore.

Driving of the insert is effected by a mandrel which heretofore had comprised an elongate hardened metal cylinder having a driving end and a torque transmitting end. An example of such mandrel is disclosed in U.S. Pat. No. 3,348,293.

Mandrels of the type disclosed in the above noted patent required frequent replacement for the reasons more fully set forth in my U.S. Pat. No. 4,077,101, which patent refers to an improved drive mandrel incorporating a polymeric body portion whereby the torquing forces required for application of an insert were cushioned by the polymeric material, resulting in increased life for the tool and reduced instances of cross-threading or misapplication of the insert.

I have determined that although the effective life of the tool of my aforesaid patent is generally greater than tools heretofore used, the considerable torsional forces required to be exerted in the driving of an insert into position when applied through a polymeric driver member as shown and described in my aforesaid United States patent, particularly where the inserts and mandrel are of small diameter, are such as in time to rupture or destroy portions of the threaded end of the mandrel, reducing the effective life of the tool.

SUMMARY OF THE INVENTION

The present invention may be summarized as directed to an improved polymeric drive mandrel for the application of helical drive inserts into tapped bores. I have discovered that the life shortening damage occasionally experienced in respect of drive mandrels as disclosed in my U.S. Pat. No. 4,077,101 is a result of the radial constriction of the insert about the mandrel when the same is subjected to high torques, such as are necessary to drive the insert into position.

I have further discovered that such constriction, particularly considering the angular or wedge-shaped cross-sectional configuration of the wire or stock metal forming the helical inserts, produces a spreading or wedging force particularly on the lead convolution of the mandrel, which force, in time, may cause rupture and dislocation of said lead convolution.

I have further discovered that by providing within the polymeric mandrel a driving blade directed substantially axially of the mandrel, which blade extends diametrically of the insert and which includes side terminal edges disposed at or just beneath the roots of the threads at the driving end of the mandrel, damaging effects of torque applied to the threads are negated, whereby there is provided a mandrel or insert driver tool having the advantages set forth in my U.S. Pat. No. 4,077,101 and having, in addition, a greatly extended useful life. The driver blade, in addition to reinforcing the thread components, provides a wear resistant drive surface for engagement with the drive tang of the insert.

In accordance with a preferred embodiment of the invention, the driver blade may include a sawtooth edge extending to and exposed at the periphery of the mandrel adjacent the drive end, the sawtooth conforming in silhouette to the configuration of the threads. The blade may be retained in position by providing projecting protuberances, darts or like non-reentrant hooks which, when mounted into a recess in the polymeric body portion of the mandrel, distort the polymeric material to resist removal. Alternatively, the polymeric body portion may be molded in situ over the driver blade.

Accordingly, it is an object of the invention to provide an improved polymeric drive mandrel for the application of helical inserts which is highly resistant to damage in use and yet affords the advantages set forth in my U.S. Pat. No. 4,077,101.

A further object of the invention is the provision of a polymeric drive mandrel of the type described, including a radially, relatively incompressible drive blade member which extends from the driver end of the mandrel toward the torque transmitting end, whereby damage to the polymeric threads of the mandrel is prevented as a result of limiting the radial compressive forces which may be transmitted to the insert to an extent that will preclude distortion thereof.

A still further object of the invention is the provision of a polymeric drive mandrel of the type described wherein the driving torsional forces are applied to the insert tang by the blade member, which blade member extends a substantial distance within the body portion of the mandrel, whereby the torsional forces exerted against the drive tang are distributed over a substantial length of the body portion, thus reducing the forces applied against any limited area of the body.

To attain these objects and such further objects as may appear herein or be hereinafter pointed out, I make reference to the accompanying drawings, forming a part hereof, in which.

Figure 5:
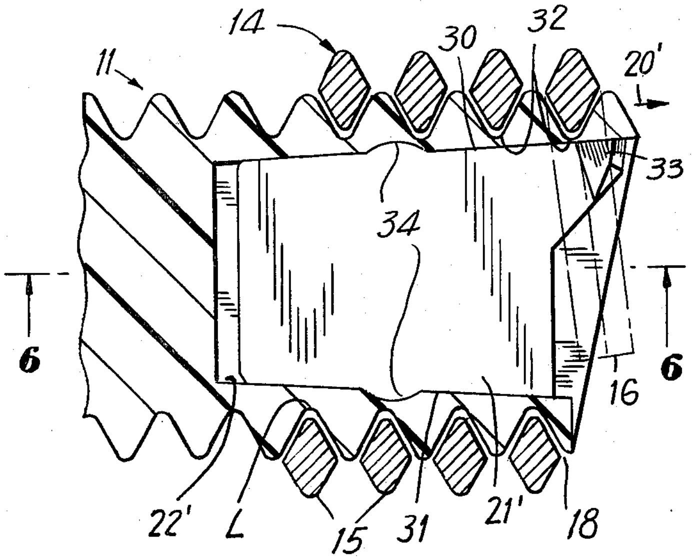
FIG. 5 is a longitudinal section taken on the line 5—5 of FIG. 4.
Figure 9:
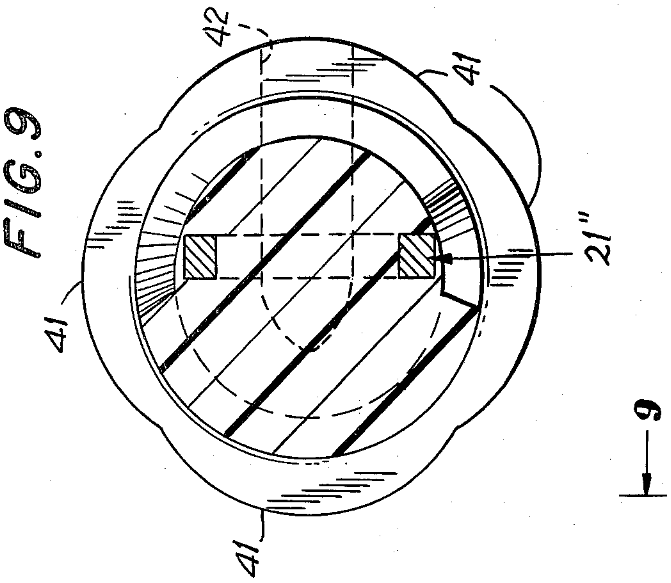
Figure 7:
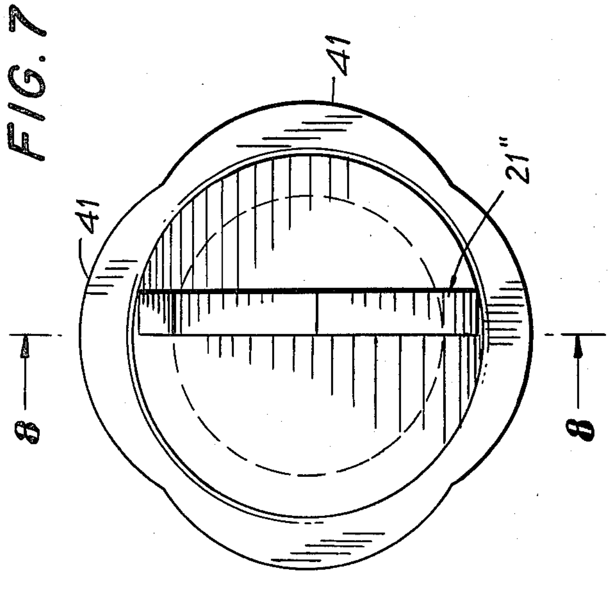
Figure 8:
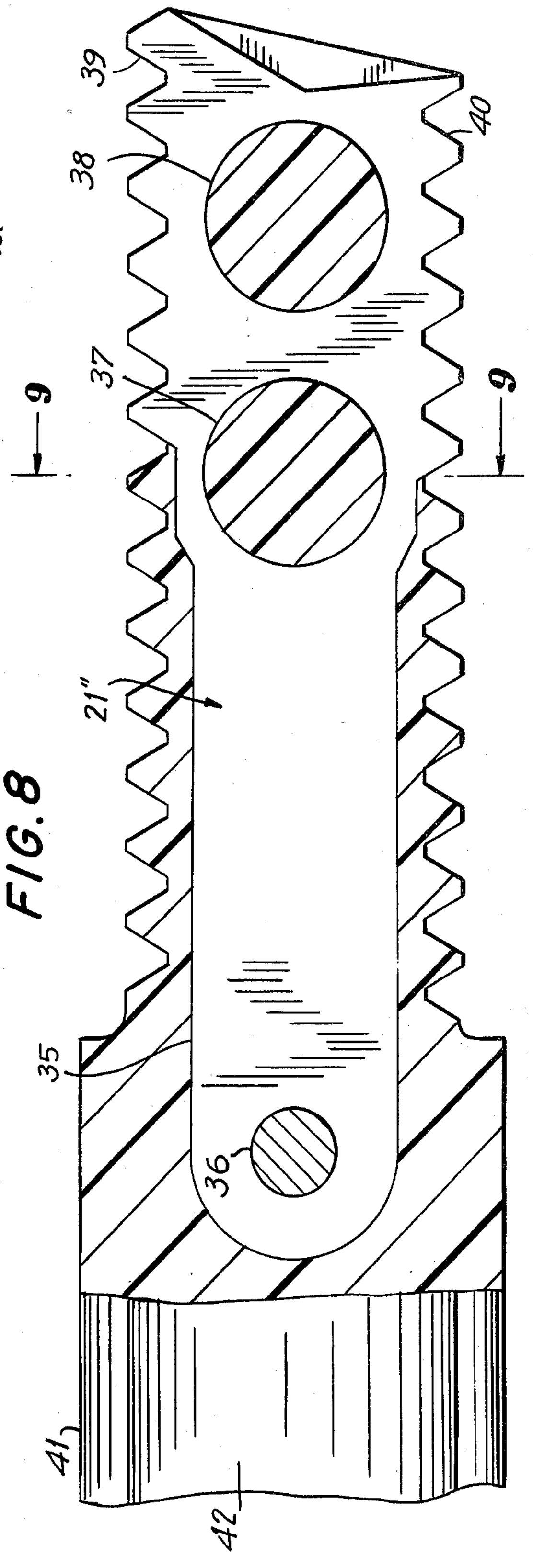

FIG, 6 is a horizontal section taken on the line 6—6 of FIG. 5;

FIG. 7 is a front elevational view of a further embodiment of the invention;

FIG. 8 is a longitudinal section taken on the line 8—8 of FIG. 7;

FIG. 9 is a transverse section taken on the line 9—9 of FIG. 8.

Referring now to the drawings, there is disclosed a mandrel 10 comprising a body portion 11, a torque applying end or handle 12, and an insert receiver or driving end 13. The insert members 14, which are known per se and illustrated and described in the above referenced patents, comprise a series of helical turns 15 of stainless steel or like material—see FIGS. 4 and 5, terminating in a driving tang 16. As noted, the driving tang extends radially, providing a means for application of a driving torque to the insert.

The insert device includes a weakened break-off line 17, about which the tang and adjacent portions of the insert are fractured and removed after the insert has been positioned. It will be observed that the convolutions 15 of the insert member are normally diamond-shaped in section.

The mandrels are constructed to provide a clearance area 18 between the unstressed insert and the mandrel whereby the inner diameter of the insert is larger than the outer diameter of the mandrel, enabling the insert to be readily threaded over the mandrel. In the course of driving and upon application of torque, the insert member is constricted radially and engages tightly over the mandrel—see dash line positions of convolutions 15, FIG. 2.

I have discovered that the radial inward compression of the insert tightening about the mandrel exerts on the threads, and particularly on the lead convolution 19, an axial outward force vector in the direction of arrow 20 as well as an inward axial force on the next adjacent thread. Where the mandrel is fabricated of a polymeric material, the force noted, when the mandrel is fabricated in accordance with my aforesaid U.S. Pat. No. 4,077,101 may, after fatigue of the polymeric material, become sufficient to rupture, dislocate or distort the said lead convolution to the point where the same is deflected forwardly and separated from the body of the mandrel, rendering the mandrel in accordance with my said patent unsuitable for its intended purpose. Also, the inward force may be sufficient to deform the second thread convolution although, since such convolution is reinforced by inwardly disposed parts of the mandrel shank, the effects of such force vector are less significant.

In accordance with the present invention, the benefits of utilizing a polymeric drive mandrel as outlined in my aforesaid patent are combined with the durability of the all-metal mandrel by the provision of an drive blade 21 extending axially of the mandrel in a blade receiver slot or channel 22 formed therein.

More particularly, the drive blade 21 includes a tapered shank portion 23, narrower at its end 24 and flaring slightly outwardly toward the outer terminus 25 of the shank. The shank 23 may include retainer barbs 26.

Figure 2:
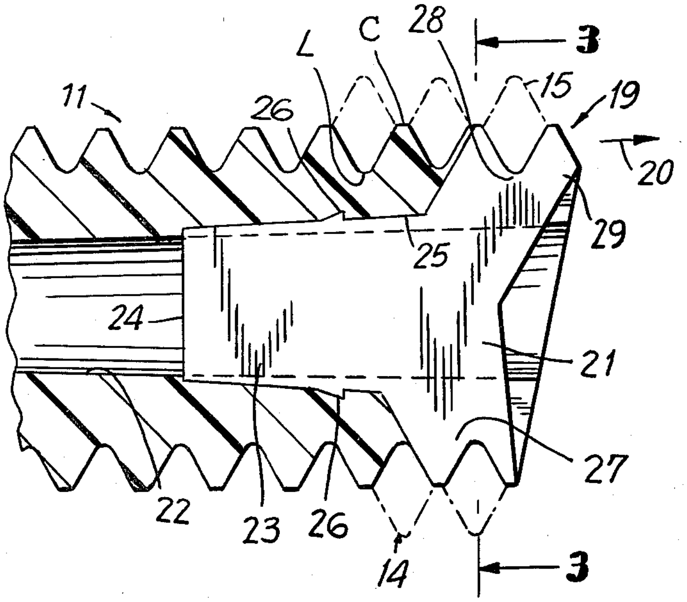
FIG. 2 is a magnified section taken on the line 2—2 of FIG. 1.

The blade 21 is applied to the body 11 of the mandrel 10 by forcing the same inwardly of the channel 22 to the position shown in FIG. 2. In such position, the side edges 27, 28, which are sawtooth in silhouette, register with the crests C and the lands L of at least the first convolution 19 of the external thread of the mandrel. The transverse dimension of the blade receiver slot 22 is coordinated with the thickness of the blade member 21 such as to provide a tight fit between the noted parts.

In use, an insert member is threaded over the end 13 of the mandrel until the drive tang 16 of the insert lies adjacent the tooth 29, providing a driving connection between the mandrel and the tang. The insert is applied to the bore by advancing the driving end 13 of the mandrel with the mounted insert against the tapped bore into which the insert is to be threaded and rotating the mandrel, using the tripping portion or handle 12 thereof.

As will be readily appreciated from inspection of FIG. 2, the insert will tend to reduce in diameter as driving torque is progressively applied. However, the reduction in diameter of the insert is resisted by the blade portion 21 which is relatively radially incompressible as contrasted with the polymeric material, which may comprise nylon (a long chain polyamide), or an acetal resin sold by DuPont Corporation under the trademark DELRIN. By limiting the degree of inward compression which may be exerted by the insert against the polymeric material, it is assured that the force in the direction of the arrow 20 is likewise limited to an extent not exceeding the elastic limit of the polymer and, thus, destruction and unseating of the lead convolution 19 is prevented.

Figure 3:
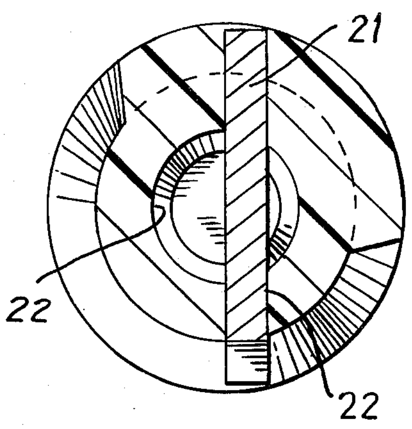
FIG. 3 is a transverse section taken on the line 3—3 of FIG. 2.

As is best seen in FIG. 3, the slot or channel 22 retaining the blade 21 may be slightly offset from the axial center line of the body portion 11 of the mandrel. The driving torque exerted against the tang by the tooth 29 will be distributed over a substantial longitudinal extent of the shank or body portion by virtue of the intimate engagement along a substantial length of the blade with the polymeric material. Preferably, an engaging area of at least one third of the distance between the end convolution 19 and the beginning of the handle 12 is provided.

By means of the improvement described, the advantage of employing a polymeric material, as outlined in my aforesaid United States patent, are achieved without fear of damage to the lead threads formed in the polymeric material.

Figure 4:
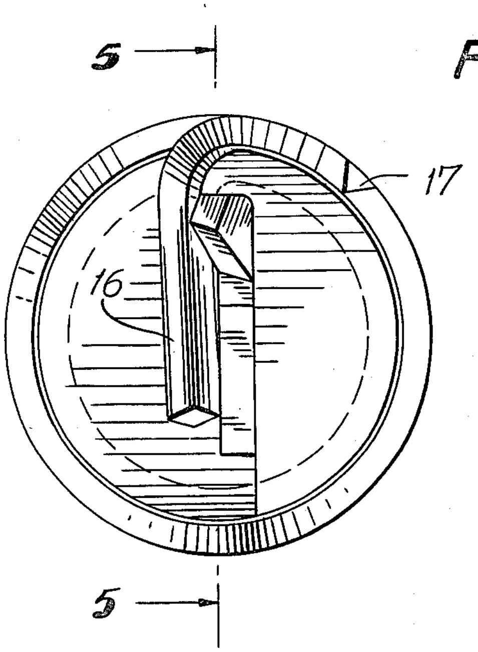
FIG. 4 is an end elevational view of a further embodiment of the invention.
Figure 6:
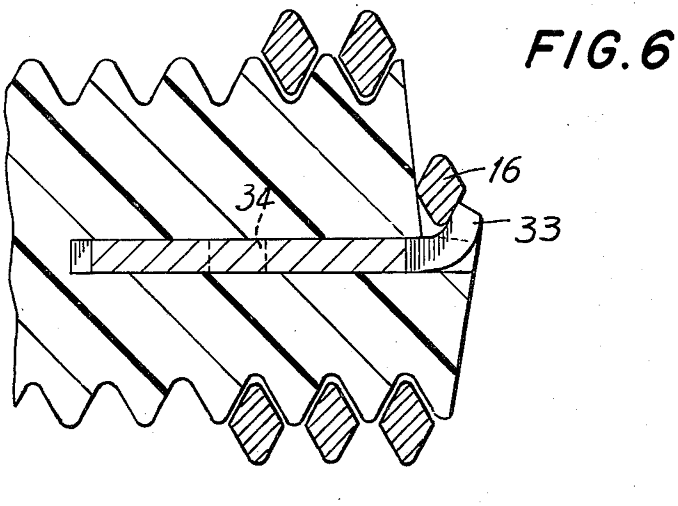

In FIGS. 4, 5 and 6 wherein like parts have been given like reference numerals, there is disclosed a further embodiment of the invention. In this embodiment the blade portion 21′ is seated in slot 22′ formed in the shank or body portion 11 of the mandrel.

Figure 1:
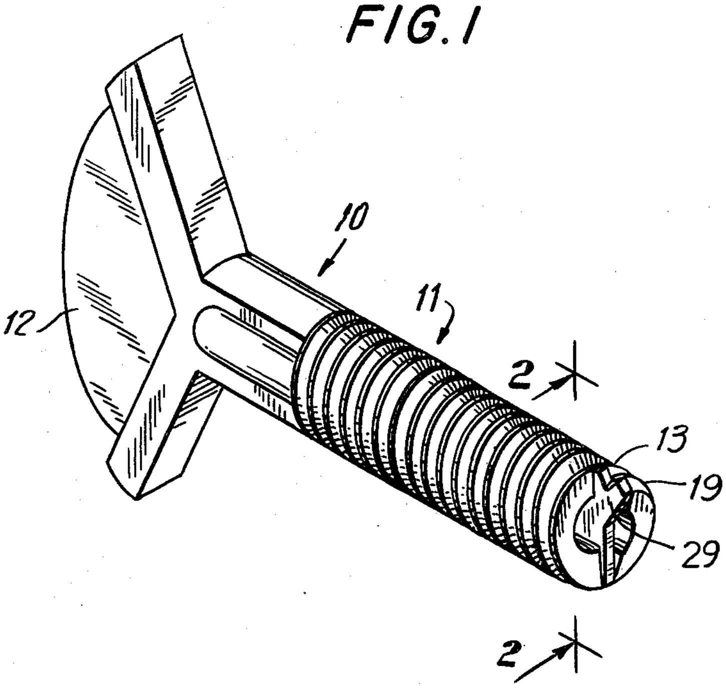
FIG. 1 is a perspective view of a mandrel device in accordance with the invention.

The embodiment of FIGS. 4, 5 and 6 differs from that of FIGS. 1 to 3 in that side edges 30, 31 of the blade will, in extending completely to the periphery of the body portion, intimately underlie the roots 32 of the lands L of at least the first few threads of the body portion. Although the blade member 21′ does not extend entirely to the periphery of the body portion, it nonetheless extends sufficiently close thereto as to provide substantial resistance to radial inward contraction of the insert, thereby limiting the deflecting forces in the direction of the arrow 20′.

Optionally, the blade 21′ may include a curved driving tooth 33 which overlaps a portion of the drive tang 16.

In the embodiment of FIGS. 4 to 6, the blade portion 21' is held in position within the slot 22' by a pair of arcuate protuberances 34, 34, which indent into the resilient material of the body portion in the course of mounting of the blade whereby, once the blade member is inserted into position, it is fixed against ouward removal.

In the embodiment of FIGS. 7 to 9, the blade member 21" includes an elongate shank 35 having a plurality of through-going apertures 36, 37, 38 formed therein. In this embodiment the blade 21" is molded in situ in the course of molding of the mandrel assembly, the blade being retained in position by the flow of the polymeric material through the apertures 37, 38.

In the embodiment of FIGS. 7 to 9, side edges 39, 40 of the blade 21" extend to the periphery of the body portion and have a sawtooth configuration matching the configuration of the threads.

As best seen from FIGS. 7 and 8, the periphery of the embodiment therein disclosed may include lobes or cusps 41 (four being illustrated) rather than the device being circular in section.

The body portion of the embodiment of FIGS. 7 to 9 may include a laterally directed void 42 resulting from the withdrawal after molding of a jig used in positioning and maintaining the blade in the desired orientation during the molding procedure by engagement with aperture 36 of the blade.

From the foregoing it will be understood that each of the embodiments hereinabove disclosed pertains to an improved mandrel assembly having the advantages set forth in my U.S. Pat. No. 4,077,101 but overcoming the tendency of the mandrel device therein illustrated to rupture or suffer fatigue, particularly at the lead thread or convolution thereof.

The embodiments of the present invention have in common the concept of employing a metal drive blade which is relatively radially incompressible and which is disposed at or intimately adjacent the roots of the lands of the threads, especially at the driving end thereof, whereby the strangling or radially constrictive forces applied by the insert to the mandrel in the course of driving the same are resisted not solely by the polymeric material but also by the driving blade.

The device has the further advantage that the driving torque which is applied by the blade against the tang of the insert is distributed and exerted against a substantial extent of the length of the polymeric material of the shank against which the blade is engaged, thus eliminating localized force applications.

Numerous variations of design will occur to those skilled in the art who have been made cognizant of the present disclosure without departing from the spirit of the invention. Accordingly, the invention is to be broadly construed within the scope of the appended claims.

Having thus described the invention and illustrated its use, what I claim as new and desire to secure by Letters Patent is:

1. An improved drive mandrel for the insertion of helical inserts having drive tangs into tapped bores which are undersized as respects the diameter of said inserts comprising, in combination, an axially elongated, generally cylindrical resilient polymeric body portion including torquing means at one end and a drive insert receiver portion at the other end, said body portion having an external peripheral thread portion for supporting said inserts, said thread portion beginning at said drive end and extending at least part way toward said torque applying end, said thread portion including crests and lands disposed between said crests, the improvement which comprises a substantially radially incompressible metallic drive blade extending axially within said body portion, said blade including a drive tooth projecting axially beyond said drive end of said body portion for engagement with the drive tang of an insert mounted on said threaded portion, said blade including diametrically opposed, axially extending side edges, said side edges being disposed substantially at the level of the said lands for at least the first convolution of said thread portion at said other end whereby radial inward constriction of said first convolution of said insert member is limited by said substantially radially incompressible drive blade.

2. A drive mandrel in accordance with claim 1 wherein said side edges of said metallic blade include sawtooth peripheral portions, the configuration of said sawtooth peripheral portions matching the configuration and transverse dimension of said crests and lands of said thread portion at least at said first convolution.

3. Apparatus in accordance with claim 2 wherein said blade includes at least one through-going aperture, said body portion being molded in situ about said blade whereby increments of said polymer extend through said apertures thereby positively to locate said blade member within said body portion.

4. Apparatus in accordance with claim 2 wherein said body portion includes an axially directed internal receiver slot diverging toward said drive end and said blade includes an elongate tapered shank, the transverse dimensions of said shank being greater than the transverse dimensions of said axially directed slot, said shank and the walls defining said slot including complemental interlock portions in stressed condition in the mounted position of said shank in said slot, whereby said shank is fixedly coupled to said body portion.

5. Apparatus in accordance with claim 1 wherein said drive blade member extends axially for a distance of at least about one third of the length of said body portion from said drive end toward said torque transmitting means.

6. Apparatus in accordance with claim 1 wherein said drive tooth of said blade is inclined relative to the longitudinal axis of said body portion into partial overlapping condition of said drive tang in the mounted position of said insert on said mandrel.

* * * * *